US008276095B2

(12) United States Patent
Cutler et al.

(10) Patent No.: US 8,276,095 B2
(45) Date of Patent: Sep. 25, 2012

(54) SYSTEM FOR AND METHOD OF GENERATING AND NAVIGATING WITHIN A WORKSPACE OF A COMPUTER APPLICATION

(75) Inventors: Stephen Cutler, Captiva, FL (US); William MacKenzie, III, Golden, CO (US)

(73) Assignee: Advanced Intellectual Property Group, LLC, Fort Myers, FL (US)

( * ) Notice: Subject to any disclaimer, the term of this patent is extended or adjusted under 35 U.S.C. 154(b) by 1215 days.

(21) Appl. No.: 10/783,543

(22) Filed: Feb. 20, 2004

(65) Prior Publication Data
US 2005/0188329 A1    Aug. 25, 2005

(51) Int. Cl.
*G06F 3/048* (2006.01)
(52) U.S. Cl. .................. 715/804; 715/782; 715/778
(58) Field of Classification Search .............. 715/804, 715/782, 778
See application file for complete search history.

(56) References Cited

U.S. PATENT DOCUMENTS

| | | |
|---|---|---|
| 5,305,435 A | 4/1994 | Bronson |
| 5,463,726 A | 10/1995 | Price |
| 5,499,334 A | 3/1996 | Staab |
| 5,564,002 A | 10/1996 | Brown |
| 5,640,579 A | 6/1997 | Koppolu et al. |
| 5,742,285 A | 4/1998 | Ueda |
| 5,771,042 A | 6/1998 | Santos-Gomez |
| 5,841,435 A * | 11/1998 | Dauerer et al. ............... 715/775 |
| 6,044,385 A | 3/2000 | Gross et al. |
| 6,084,553 A | 7/2000 | Walls et al. |
| 6,088,005 A | 7/2000 | Walls et al. |
| 6,121,966 A | 9/2000 | Teodosio et al. |
| 6,195,094 B1 | 2/2001 | Celebiler |
| 6,353,436 B1 | 3/2002 | Reichlen |
| 6,407,758 B1 | 6/2002 | Usami et al. |
| 6,590,594 B2 | 7/2003 | Bates et al. |
| 7,577,914 B1 * | 8/2009 | Stuple et al. .................. 715/764 |
| 2003/0189597 A1 * | 10/2003 | Anderson et al. ............. 345/778 |
| 2004/0066414 A1 * | 4/2004 | Czerwinski et al. .......... 345/781 |

FOREIGN PATENT DOCUMENTS
EP          613080 A2 *  8/1994
* cited by examiner

*Primary Examiner* — William Bashore
*Assistant Examiner* — Henry Orr
(74) *Attorney, Agent, or Firm* — Renner, Otto, Boisselle & Sklar, LLP

(57) ABSTRACT

A computer application and method for generating a workspace and navigating therein are disclosed. Code can be used to generate an application workspace for an associated computer application, wherein the application workspace is comprised of a plurality of screens and each screen has dimensions that are generally coextensive with a viewable area defined by the computer application. Code can be used to logically associate a plurality of sub-application windows for displaying viewable content with respective locations of the application workspace.

62 Claims, 9 Drawing Sheets

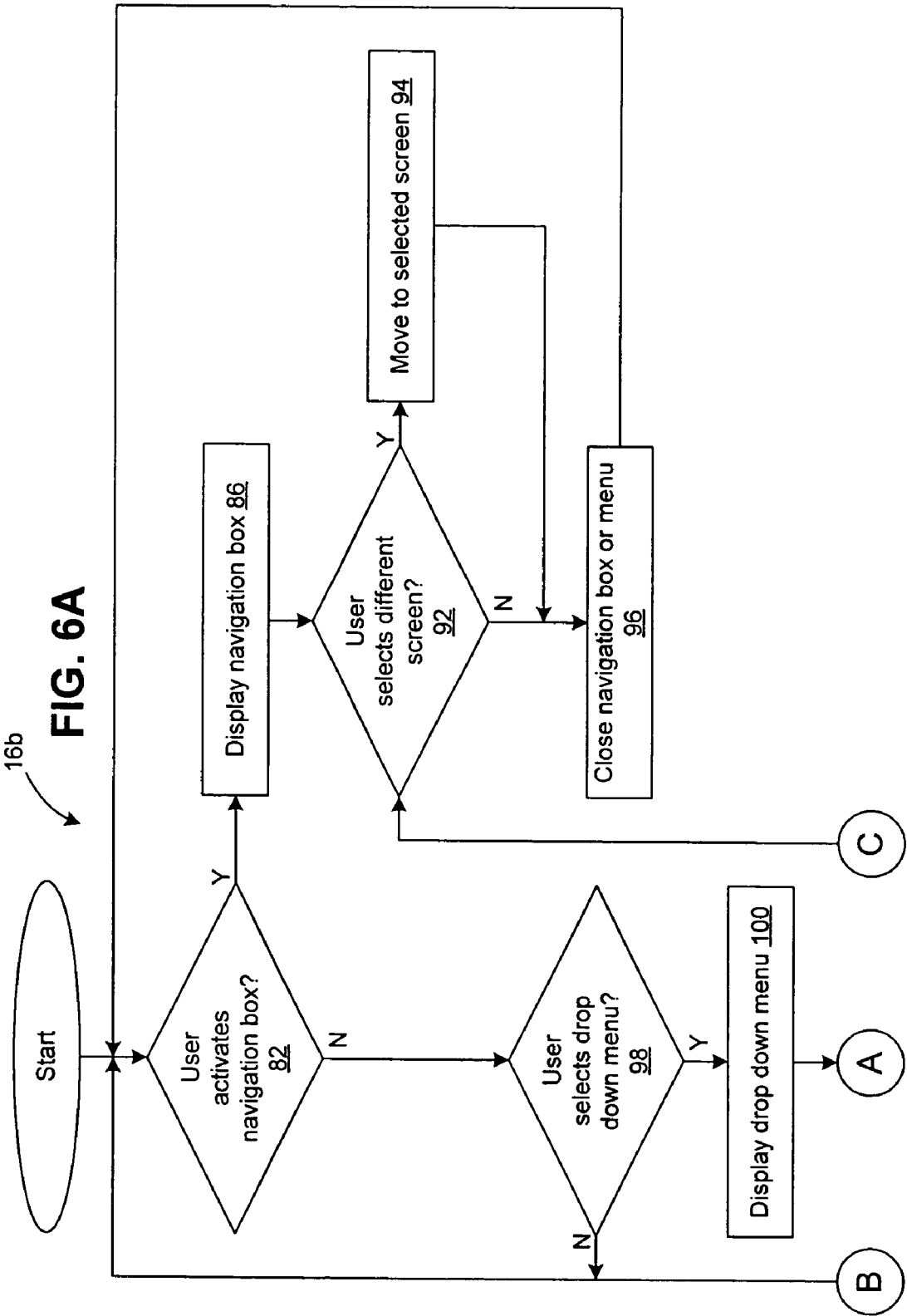

SYSTEM FOR AND METHOD OF GENERATING AND NAVIGATING WITHIN A WORKSPACE OF A COMPUTER APPLICATION

TECHNICAL FIELD

The present invention generally relates to user interaction with a computer system and, more particularly to a system for and a method of generating and navigating within a workspace of a computer application that can be executed by a computer system.

BACKGROUND ART

In most modern computing systems, the user interacts with the computing system through a graphical user interface (GUI). The GUI is the interface between the user and the computer and typically includes icons, graphics and/or text boxes, windows, and text to visually represent applications and function utilities to the user. The GUI is often based upon an operating system executed by the computer system, such as Microsoft® Windows®, Linux®, SunOS®, Unix®, MacOS®, Palm OS®, and so forth.

The GUI, which is displayed on a physical display device (or computer monitor), provides a user with a convenient way to visually organize and work with applications. Each user interactive application executed by the computer system is typically associated with a self contained application workspace window that includes menus, function buttons and an area (referred to herein as the application workspace) in which content of the application (e.g., documents, spreadsheets, charts, graphics and the like) can be displayed. As is known in the art, a window is a dedicated and potentially scrollable viewing area displayed on a computer monitor, and can be defined by a boundary. Each individual application workspace window can be arranged on a "desktop." The desktop usually has dimensions that are generally co-extensive with fixed viewing dimensions of the physical display device.

One of the benefits associated with using application workspace windows in a GUI is the ease of displayed content management. For instance, with the touch of a mouse, the user may open and close application workspace windows, organize application workspace windows (e.g., by moving the application workspace window to a desired location), re-size application workspace windows, and simultaneously display multiple application workspace windows. Accordingly, the application workspace windows may typically take a variety of forms, including, a minimized icon form that reduces the application window to the size of an icon; a maximized form that maximizes the dimensions of the application workspace window to be coextensive with a maximum allotted portion of the desktop; or an intermediate form wherein the physical size of the application workspace window is larger than an icon, but smaller than the maximum dimensions. In some systems, application workspace windows can be fully or partially displayed on the computer screen depending upon a "location" of the application workspace window relative to the computer screen and a display priority relationship with other applications (e.g., one application workspace window can be cascaded over another application workspace window).

However, there are certain drawbacks associated with the use of windows in a GUI. For instance, within a given parent application workspace window (also referred to herein as a main application workspace window), a user may have multiple child application windows (also referred to herein as a sub-application window) open and displayed on the computer screen at the same time. As is known in the art, the "parent" and "child" analogy refers to a relationship between processes in a multitasking environment, in which the parent process calls the child process.

Since the application parent workspace window is conventionally not larger than an area allotted by the desktop, the user is limited as to how many child application windows that can be effectively displayed within the parent application workspace window. If even just a handful of child application windows are opened, the child application windows would have to be minimized, tiled and/or cascaded to fit in the parent application workspace window and would likely be too small and/or cluttered to be of use to the user. Also, in many instances, the user may not remember which child application windows are open or where they are located within the parent application workspace window. In addition, conventional GUIs do not allow a user to return to a previously used arrangement of child application windows. Thus, the user is frequently faced with a tedious and convoluted task of locating, activating and reconfiguring desired child application windows to view a user's preferred arrangement of child application windows.

Accordingly, there is a need in the art for an improved system and method for generating and interacting with a workspace of a computer application.

SUMMARY OF THE INVENTION

According to one aspect of the invention, the invention is directed to a computer application workspace generation and navigation tool embodied on a computer-readable medium. The computer application workspace generation and navigation tool can include code that generates an application workspace for an associated main computer application, the application workspace comprised of a plurality of screens, each screen having dimensions that are generally coextensive with a viewable area defined by the main computer application. In one embodiment, such a workspace generation and navigation tool can further include code that logically associates a plurality of sub-application windows with respective locations of the application workspace, the sub-application windows for displaying content of at least one sub-application that is associated with the main computer application.

According to another aspect of the invention, the invention is directed to a computer application workspace generation and navigation tool embodied on a computer-readable medium. The computer application workspace generation and navigation tool can include code that generates an application workspace for an associated main computer application; code that logically associates a plurality of sub-application windows with respective locations of the application workspace, the sub-application windows for displaying content of at least one sub-application that is associated with the main computer application; and code that stores the logical associations of the at least one sub-application window as an application workspace arrangement.

According to yet another aspect of the invention, the invention is directed to a computer application workspace generation and navigation tool embodied on a computer-readable medium. The computer application workspace generation and navigation tool can include code that generates an application workspace for an associated main computer application; code that logically associates a plurality of sub-application windows with respective locations of the application workspace, the sub-application windows for displaying content of at least one sub-application that is associated with the main computer application; and code that stores a layout of the application workspace including a number and arrangement of screens that define the application workspace and relative location of each sub-application window within the application workspace.

According to another aspect of the invention, the invention is directed to a computer application workspace generation and navigation tool embodied on a computer-readable medium. The computer application workspace generation and navigation tool can include code that generates a workspace for at least one of an associated computer application and an operating system desktop; and code that, upon initiation of a window, logically associates the window with a location of the workspace identified by user action.

According to another aspect of the invention, the invention is directed to a method of generating a computer application workspace. The method can include generating an application workspace for a main computer application, the application workspace comprised of a plurality of screens, each screen having dimensions that are generally coextensive with a viewable area defined by the main computer application. In one embodiment, such a method of generating a computer application workspace can further include logically associating a plurality of sub-application windows with respective locations of the application workspace, the sub-application windows for displaying content of at least one sub-application that is associated with the main computer application.

According to one more aspect of the invention, the invention is directed to a method of generating a computer application workspace. The method can include providing an application workspace for an associated main computer application; logically associating a plurality of sub-application windows with respective locations of the application workspace, the sub-application windows for displaying content of at least one sub-application that is associated with the main computer application; and storing the logical associations of the at least one sub-application window as an application workspace arrangement.

According to another aspect of the invention, the invention is directed to a method of generating a computer application workspace. The method can include providing an application workspace for an associated main computer application; logically associating a plurality of sub-application windows with respective locations of the application workspace, the sub-application windows for displaying content of at least one sub-application that is associated with the main application; storing a layout of the application workspace including a number and arrangement of screens that define the application workspace and relative location of each sub-application window within the application workspace.

According to another aspect of the invention, the invention is directed to a method of generating a computer application workspace. The method can include providing a workspace for at least one of an associated computer application and an operating system desktop; and upon initiation of a window, logically associating the window with a location of the workspace identified by user action.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in other drawings. Moreover, in the drawings, like reference numerals designate corresponding parts throughout the several views.

DISCLOSURE OF INVENTION

The following description is exemplary in nature and is in no way intended to limit the scope of the invention as defined by the claims appended hereto.

Figure 1:
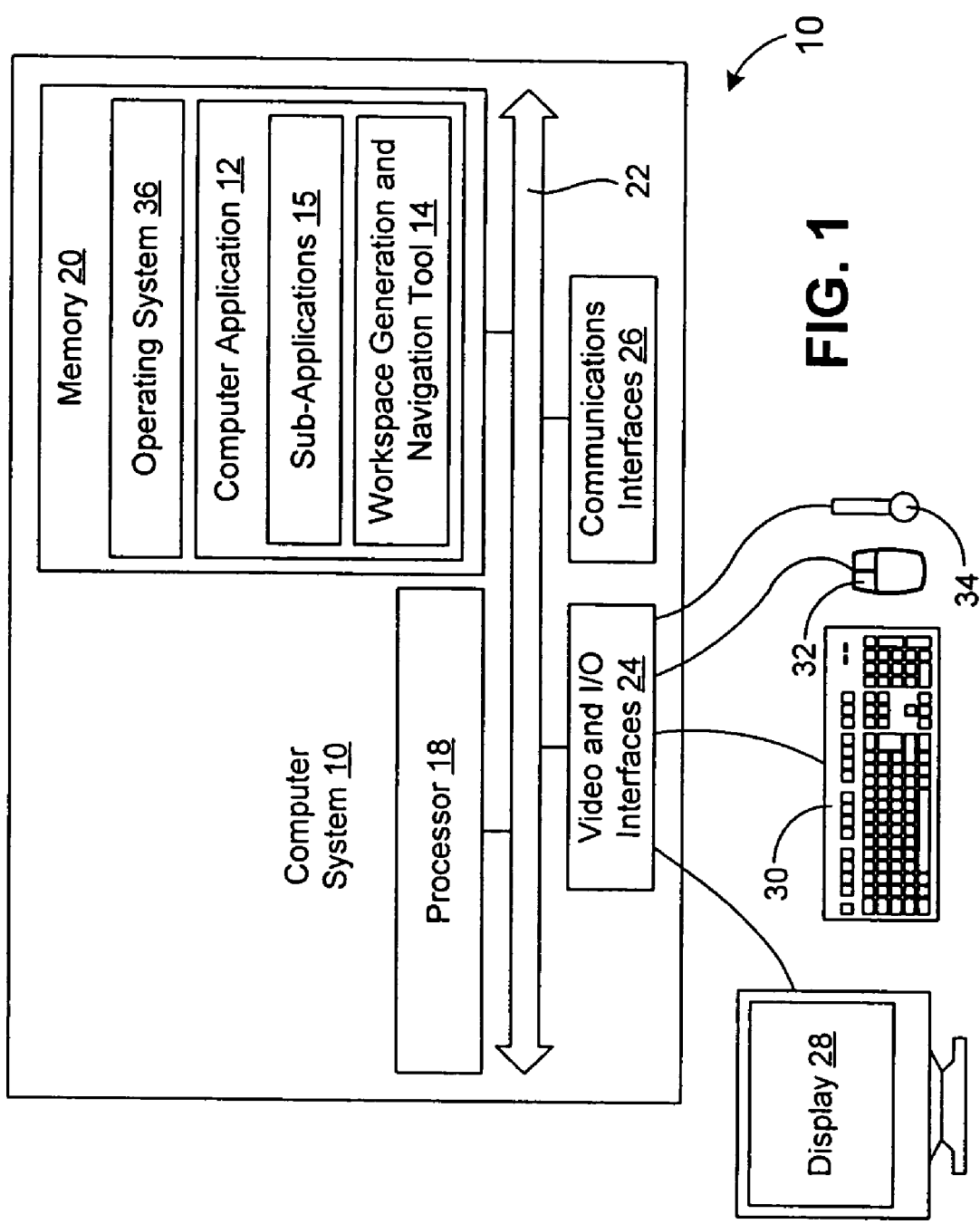
FIG. 1 is a block diagram of a computer system according to the present invention.

With reference to FIG. 1, illustrated is a schematic block diagram of a computer system 10 capable of executing a computer application (or program) 12 having an application workspace generation and navigation tool 14 in accordance with aspects of the present invention. As will be described in greater detail, the tool 14 can include an application workspace generation component and a navigation component that assist a user of the computer system 10 in defining the size of and navigating within an application workspace that is associated with the computer application 12. The computer application 12 can comprise a main computer application having associated therewith a main application window and which can be logically associated with or call one or more computer sub-applications 15. The sub-applications 15 can each have one or more associated sub-application windows.

In one embodiment, the computer application 12, the workspace generation and navigation tool 14 and/or the sub-applications 15 are embodied as one or more computer programs (e.g., one or more software applications including compilations of executable code). The computer program(s) can be embodied on a computer readable medium, such as a magnetic or optical storage device (e.g., hard disk, CD-ROM, DVD-ROM, etc.).

To execute the computer program 12 and associated workspace generation and navigation tool 14 and sub-applications 15, the computer system 10 can include one or more processors 18 used to execute instructions that carry out a specified logic routine(s). In addition, the computer system 10 can have a memory 20 for storing data, software, logic routine instructions, computer programs, files, operating system instructions, and the like. As illustrated, the computer application 12, associated workspace generation and navigation tool 14 and sub-applications 15 can be stored by the memory 20. The memory 20 can comprise several devices and includes, for example, volatile and non-volatile memory components. Accordingly, the memory 20 can include, for example, random access memory (RAM), read-only memory (ROM), hard disks, floppy disks, compact disks (e.g., CD-ROM, DVD-ROM, CD-RW, etc.), tapes, and/or other memory components, plus associated drives and players for these memory types. The processor 18 and the memory 20 are coupled using a local interface 22. The local interface 22 can be, for example, a data bus with accompanying control bus, a network, or other subsystem.

The computer system 10 can have various video and input/output interfaces 24 as well as one or more communications interfaces 26. The interfaces 24 can be used to couple the computer system 10 to various peripherals, such as a display 28 (e.g., a CRT display, an LCD display, a plasma display, etc.), a keyboard 30, a mouse 32, a microphone 34, a camera (not shown), a scanner (not shown), a printer (not shown), a speaker (not shown) and so forth. The interfaces 26 can be comprised of, for example, a modem and/or network interface card, and can enable the computer system 10 to send and receive data signals, voice signals, video signals, and the like via an external network, such as the Internet, a wide area network (WAN), a local area network (LAN), direct data link, or similar wired or wireless system.

The memory 20 can store an operating system 36 that is executed by the processor 18 to control the allocation and usage of resources in the computer system 10, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the computer application 12, the associated workspace generation and navigation tool 14 and the sub-applications 15, depend as is generally known by those with ordinary skill in the art. The operating system 36 also controls much of the user interface environment presented to a user, such as features of the overall GUI for the computer system 10. In some operating systems, application programs make use of operating system functions by issuing task commands to the operating system (e.g., a request to display certain information), which then performs the requested task.

In another embodiment, the workspace generation and navigation tool 14, or components thereof, can be integral with the operating system 36. In this manner, operating system controlled features, such as a desktop or general computer application functionality, can be sized and navigated in the manner described herein for an application workspace of the computer application 12. In yet another embodiment, the workspace generation and navigation tool 14, or components thereof, can be embodied in stand alone software called by the operating system 36 and/or computer application 12.

With additional reference to FIG. 2, a logical hierarchy of GUI components, beginning with an operating system (OS) desktop 38, that are displayed on the display 28 will be described. The appearance, arrangement and user control of many aspects of the GUI components and will generally be dependent on the specific operating system 36 executed by the computer system 10.

As is commonly used in the art, the desktop 38 is defined by the operating system 36 and provides the basic on-screen infrastructure for a user's interaction with the computer system 10. As an example, a Windows® based operating system provides a user with a desktop environment where various icons 40 can be displayed, various toolbars 42 and/or status bars can be displayed, and/or where various windows can be displayed including, for example, a main application workspace window 44. In most cases, the dimensions of the desktop 38 are coextensive with a visible portion of the physical display device 28 upon which the desktop 38 is displayed.

As used herein, an "application workspace window" is a window dedicated to a specific computer application (or "program") that is executed by the computer system 10. The main application workspace window 44 is generated by the computer application 12. Sub-application windows will be described in greater detail below, but are generated by corresponding sub-applications 15. Nevertheless, the term sub-application window explicitly includes any window generated by the main application 12 and which is subordinate to the main application workspace window 44. Although any given application can be associated with multiple main application workspace windows 44, the invention will be described in an environment where one main application workspace window 44 is displayed for the computer application 12. As an example, the computer application 12 can be a securities market and market maker tracking system. Such a system is described in co-owned U.S. patent application Ser. No. 10/167,950, filed Jun. 12, 2002 (U.S. patent application publication No. 2003/0069834, published Apr. 10, 2003) and in co-owned U.S. patent application Ser. No. 09/911,772, filed Jul. 24, 2001 (U.S. patent application publication No. 2003/0065608, published Apr. 3, 2003), the disclosures of which are herein incorporated by reference in their entireties. As should be appreciated, other computer applications 12 can be associated with the functionality of the workspace generation and navigation tool 14 and can include, for example, an Internet browser, an electronic mail program, a drawing program, a word processing program, a spreadsheet program, a presentation program, and so forth.

In another example, the main computer application can be a worker productivity suite that interacts with various sub-applications, such as a word processing program (e.g., Microsoft® Word®), a spreadsheet program (e.g., Microsoft® Excel®), a presentation program (e.g., Microsoft® Powerpoint®), an electronic mail program (e.g., Microsoft® Outlook®), a drawing program (e.g., Microsoft® Visio®), a database program (e.g., Microsoft® Access®), and so forth. In another example, the main program 12 can be an Internet connectivity program, such as America On-Line® (AOL®). The AOL® main program 12 can interact with various sub-programs 15, such as an instant messenger sub-program, a web-browser sub-program, an email sub-program, a welcome screen sub-program, and so forth.

In the illustrated embodiment, the main application workspace window 44 is shown in an intermediate form that has a size between a minimized form (e.g., an iconic representation) and a maximized form that consumes all available space on the display 28 allocated to programs by the operating system 36. However, it should be appreciated that the main application workspace window 44 can take on either the minimized or maximized forms as selected by the user.

The main application workspace window 44 provides the GUI for the user's interaction with the corresponding computer application 12. In one example, a perimeter or boundary of the displayed main application workspace window 44 is defined by a frame 46, which can include GUI items such as drop down menus 48, command buttons 50, vertical and horizontal scroll bars 52, a title bar 53, tool and/or status bars (not shown) and so forth. Within an area bounded by the frame 46 can be a viewable area 55 defined by the computer application 12 in which at least a portion of a main application workspace 54 can be displayed for viewing by a user. An "application workspace," as used herein, is dedicated to displaying computer application 12 and/or sub-application 15 content, such as pictures, video, text documents (e.g., electronic mail, word processing documents), tables, charts, spreadsheets and any other displayable items and combinations of displayable items. It is noted that the frame 46 need not form a continuous perimeter around the viewable area 55 and the viewable area 55 need not have to be contained within a frame at all.

Figure 3:
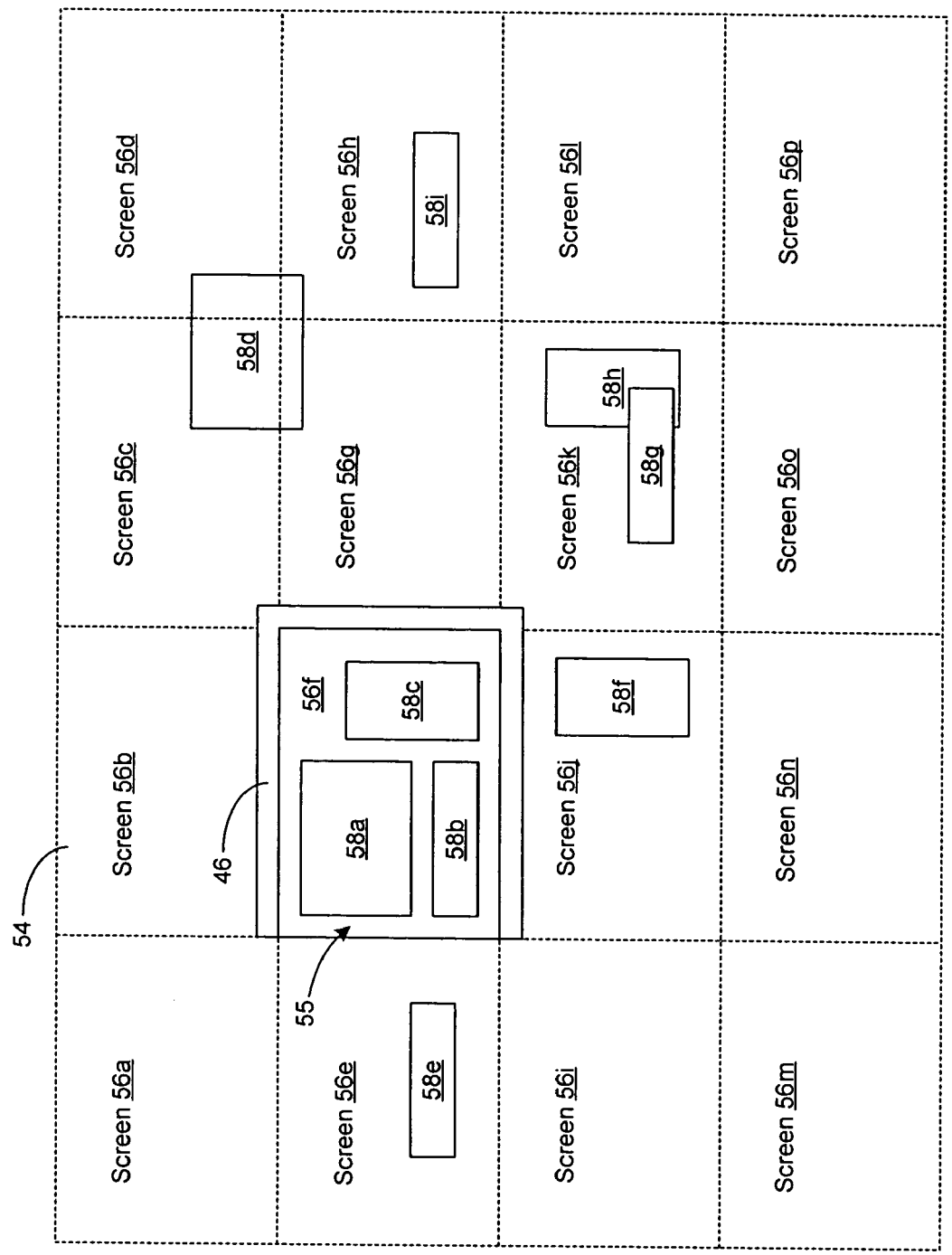
FIG. 3 is a schematic diagram of an example application workspace according to the present invention.

With additional reference to FIG. 3, the application workspace 54 can be defined by a plurality of screens 56. For instance, the workspace 54 can be made up of a plurality of contiguous screens 56 (e.g., a matrix of screens) to form a continuous area upon which application content can be logically associated. In certain operational modes, only a portion of the application workspace 54 is "visible" (e.g., displayed) in the frame 46 of the main application workspace window 44. The displayed portion of the application workspace 54 can correspond to an individual screen 56 or sections of multiple screens 56, depending on how the application workspace 54 is "positioned" relative to the frame 46. In one embodiment, the size of each screen 56 when not subjected to enlargement by "zooming in" or contraction by "zooming out" is generally coextensive with the viewable area 55 area defined by the frame 46.

As will become more apparent below, one way to consider certain operation of the workspace generation and navigation tool 14 is to consider the application workspace 54 to be analogous to a plane upon which application content is present and the frame 46 is analogous to viewing portal that is logically shifted over the application workspace 54 to allow the use to view (or "see") a portion of the application workspace 54. Alternatively, one may equally consider the application workspace 54 to be logically shifted under the frame 46. Methods and executable logic for sizing, controlling and traversing the application workspace 54 will be described below in greater detail.

In one embodiment, the computer application 12 content can be displayed in one or more discrete sub-application windows 58. An "application window" can be considered to be a region affiliated with the application workspace 54 that displays computer application 12 and/or sub-application 15 content. In the example where the application workspace 54 is considered to be analogous to a plane, the sub-application windows 58 can be considered to be located within the plane. The sub-application windows 58 can be arranged as desired by the user, such as without overlap (e.g., tiled) and spaced apart or touching, with overlap (e.g., cascaded), and combinations of these arrangements. Sub-application windows 58 can be positioned completely within a screen 56 or across multiple screens 56. In one embodiment, the sub-application windows 58 are "tied" to the application workspace 54 such that the sub-application windows 58 are not moveable out of the application workspace 54 to overlap the frame 46 of the main application workspace window 44 or onto other portions of the desktop 38. In other embodiments, one or more sub-application windows 58 can be detached from the application workspace 54 such than they can optionally overlap the main application workspace window 44, can be overlapped by the main application workspace window 44 and/or can overlap other portions of the desktop 38. In one embodiment, sub-application windows 58 can have a sub-application window frame 60 that optionally includes GUI items such as a title bar, menus, horizontal and/or vertical scroll bars, status and/or tool bars, command buttons and so forth.

Although the discussion herein is presented in the example context of one application workspace 54 in association with the main computer application 12, the main computer application 12 can be associated with a plurality of application workspaces 54 and resulting layouts upon the association of sub-application windows 58 with the application workspaces 54. In the multiple application workspace 54 embodiment, one application workspace 54 at a time can be considered active and available for user interaction as described herein. A different application workspace 54 can be made active by user action. Following the analogy where the application workspace 54 is considered analogous to a plane, in one embodiment, multiple application workspaces 54 can be thought of as being arranged in a stack, in which the prominence of each application workspace 54 and order of the application workspaces 54 can be altered by user action.

Figure 2:
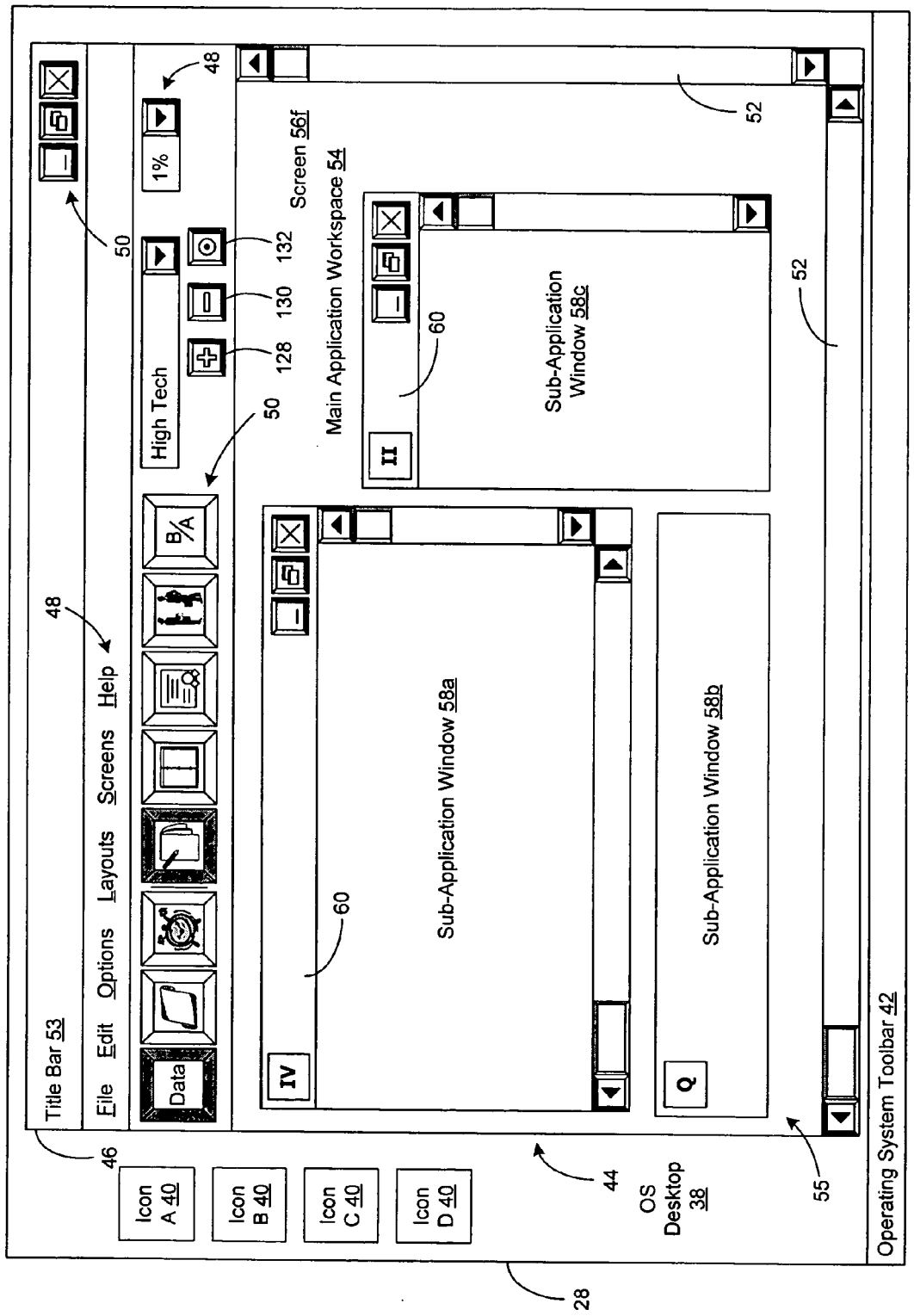
FIG. 2 is an example operating system desktop with a representative application workspace window that are displayed on a computer display device.

With continuing reference to FIGS. 2 and 3, the exemplary illustrations show the application workspace 54 divided into a 4×4 matrix of screens 56*a*-56*p* (sixteen total screens). It should be appreciated that the screens 56 need not be arranged in a matrix and, if the screens 56 are arranged in a matrix, the matrix can be of other dimensions, such as a 2×3 matrix, a 2×2 matrix, a 3×3 matrix, and so on. In the illustrated example, the frame 46 functionally overlies screen 56*f* such that a corresponding portion of the application workspace 54 is displayed. Within the area defined by screen 56*f*, sub-application windows 58*a*-*c* are present. Accordingly, sub-application windows 58*a*-*c* will be displayed within the frame 46 on the display 28 for viewing by a user of the computer system 10.

Also illustrated in FIG. 3 are additional sub-application windows 58 arranged throughout the application workspace 54. As illustrated, the sub-application windows 58 can be associated with one particular screen 56. A particular sub-application window 58 will be associated with a screen 56 when that application window is "fully contained" within the corresponding screen 56. Alternatively, if the sub-application window 58 overlies two or more screens 56, that sub-application window 58 will be associated with the screen 56 in which a majority of the sub-application window 58 resides. For example, sub-application window 58*d* has a majority of its area within screen 56*c* and will be logically associated with screen 56*c*.

The application workspace 54 can be comprised of one or more screens 56 that do not contain any portion of a sub-application window 58. In addition, when the application workspace 54 is sized, the application workspace 54 can be sized to be larger than required to accommodate the positioning of sub-application windows 58 as desired by the user. For example, if the application workspace 54 were initially sized to generally have the dimensions of the viewable area 55 (e.g., an application workspace having a size corresponding to one screen 56), and the user moved a sub-application window 58 outside the single screen dimension, the workspace generation component can automatically resize the application workspace 54 to include additional screens 56. In such a situation, the additional screens 56 can include one or more screens 56 to accommodate the moved sub-application window 58 (such as a 1×2 matrix of screens 56) or a larger number of screens 56 (such as a 3×3 matrix of screens 56) where some of the screens 56 do not contain any portion of a sub-application window 58.

In one embodiment, each screen 56 of the application workspace 54 can be associated with a unique identifying feature, such as a background color and/or pattern. The unique identifying feature of each screen can assist a user in recognizing which portion(s) of the application workspace 54 is displayed at any particular time.

Figure 4:
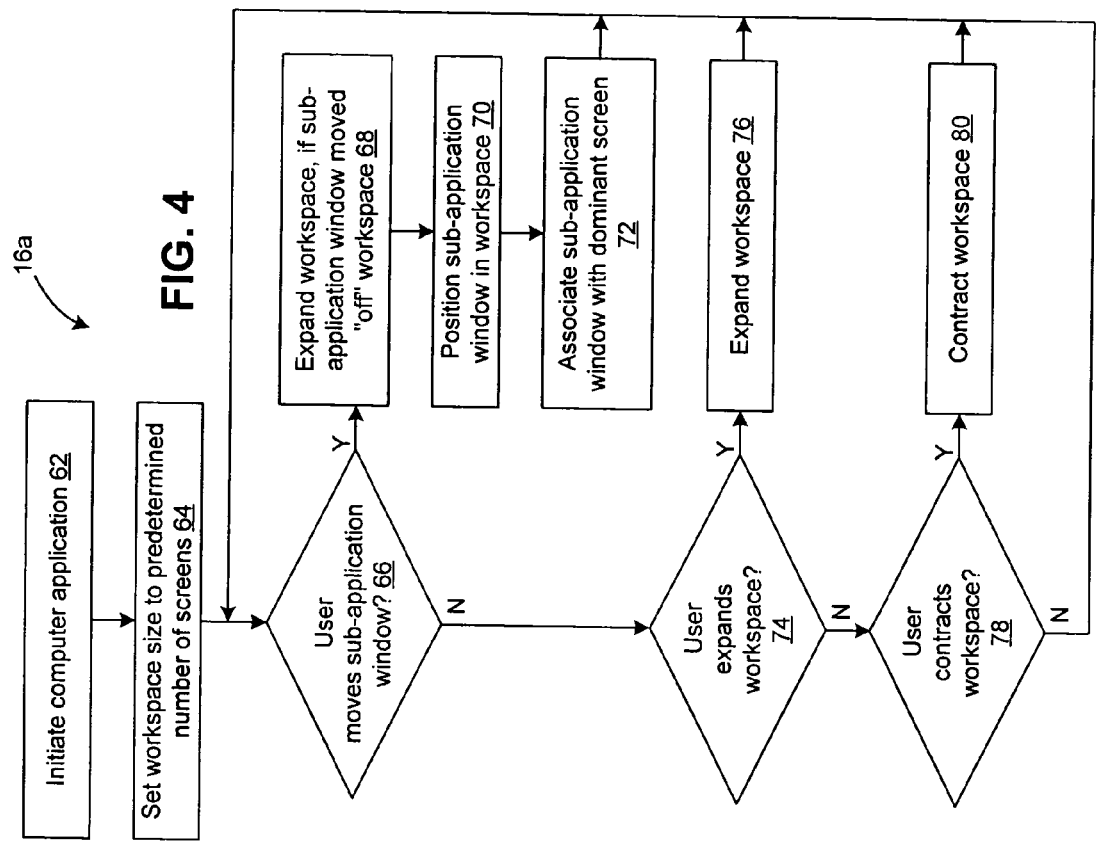
FIG. 4 is a flow diagram of operational logic for an application workspace generation component of a workspace generation and navigation tool according to the present invention.

With additional reference to FIG. 4, shown is a flow diagram depicting exemplary operational logic for a workspace generation component 16a of the application workspace generation and navigation tool 14. The illustrated architecture for the workspace generation component 16a shows operational processing blocks, each one of which may be represented by a number of subprocesses, routines or applettes. The illustrated architecture is intended to show the functionality and operation of an implementation of the above-mentioned workspace generation component 16a. If embodied in software, each functional block may represent a module, segment, or portion of code that contains one or more executable instructions to implement the specified logic functions.

Although the architecture blocks of FIG. 4 are shown in a specific order of execution, it is understood that the order of execution may differ from that depicted. For example, the order of execution of two or more blocks may be altered relative to the order shown. Also, two or more blocks shown in succession may be executed concurrently or with partial concurrence. In addition, various blocks may be omitted. It is understood that all such variations are within the scope of the present invention.

The operational logic for the workspace generation component 16a can commence in processing block 62 where the computer application 12 is initiated. Initiation of the computer application 12 can be carried out by user action, such as by "double clicking" on a desktop icon 40 corresponding to the computer application 12 or by selecting the computer application 12 from a menu or list of applications. Upon initiation of the computer application 12, in block 64, the workspace generation component 16a can set the application workspace 54 size to correspond to one screen 56 or, alternatively, to a predetermined number of screens 56. For example, upon launching of the application 12, the application workspace 54 can have dimensions that are co-extensive with the area bounded by the frame 46.

Next, in processing block 66, the workspace generation component 16a can determine whether the user has moved a sub-application window 58 that is logically associated with a currently displayed screen 56 to be at least partially located outside the presently displayed screen 56. If the user moves the sub-application window 58 in this manner, the operational logic can proceed to block 68. If the application workspace 54 has already been sized to accommodate the moved sub-application window 58 in its new location, the sub-application window 58 will be accordingly moved in processing block 70. However, in block 68, if the application workspace 54 is not currently sized to accommodate the new location of the moved sub-application window 58, the workspace generation component 16 will programmatically enlarge the application workspace 54 to include at least one additional screen 56 to accommodate the new location of the sub-application window 58.

Figure 5:
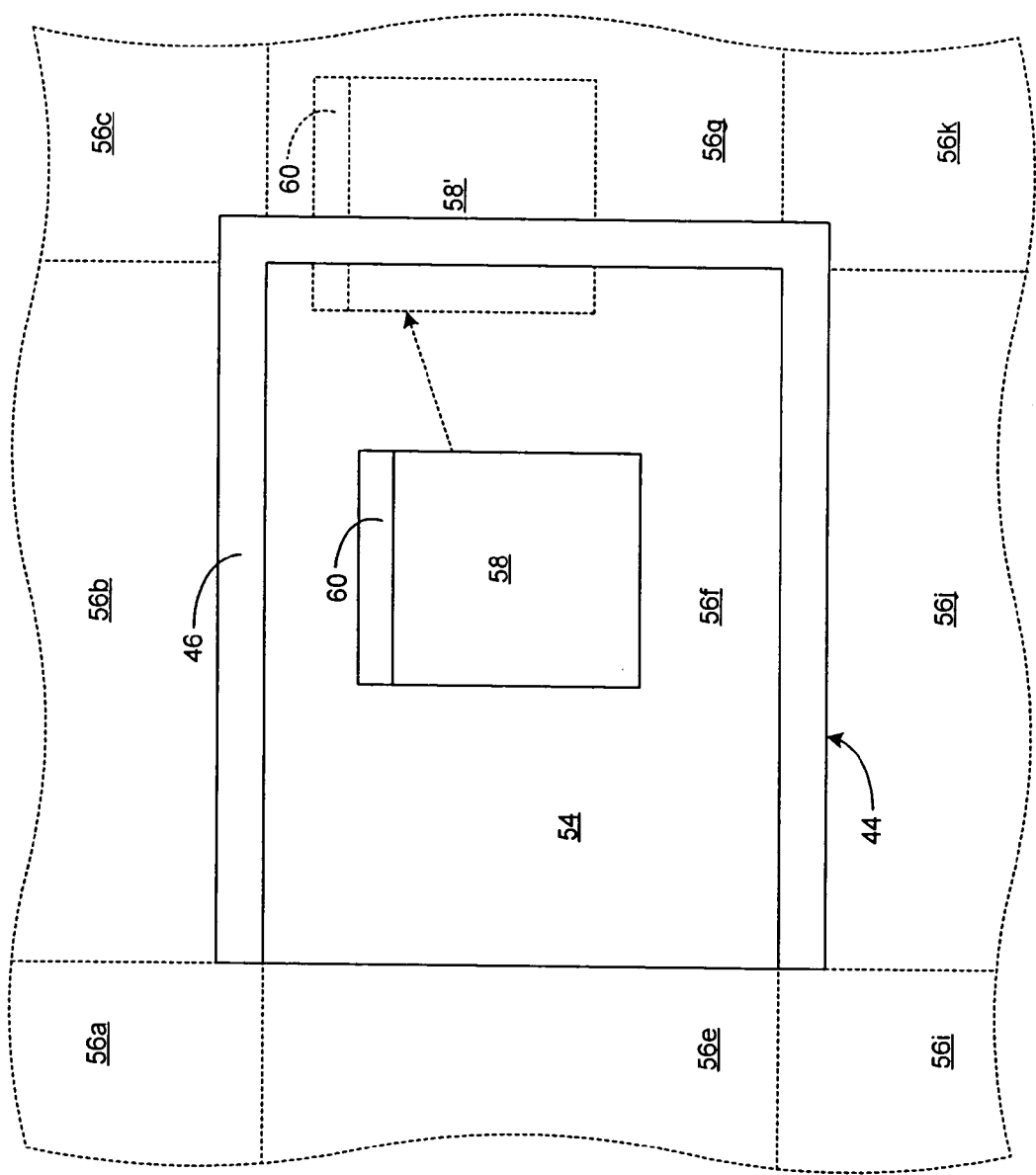
FIG. 5 is an operational diagram depicting movement of a sub-application window within the application workspace.

With additional reference to FIG. 5, shown is a schematic diagram depicting a movement of a sub-application window 58 within the application workspace 54, but outside of the currently displayed screen 56. For example, the user may click and drag a title bar of the sub-application window 58 such that the sub-application window 58 moves relative to the application workspace 54 and the frame 46 to a location that is not bounded by the frame 46. As indicated, the moved sub-application window 58' will be positioned relative to the application workspace 54 in processing block 70. Thereafter, in processing block 72, the moved sub-application window 58' will be associated with the screen 56 in which a majority of the moved sub-application window 58' is located. As will be described in greater detail below, when a navigator box is displayed, the sub-application windows 58 are displayed in accordance with the screen 56 to which the sub-application window 58 or 58' is logically associated. If the application window 58 is moved a relatively small amount (e.g., an amount such that a majority of the moved sub-application window 58' remains in the previously associated screen 56), a current logical associate with the displayed screen 56 may not be changed for the sub-application window 58 in block 72. Thereafter, the operational logic can return to block 66 to continue monitoring for user actions that invokes processing by the workspace generation component 16a.

If, in block 66, a negative determination is made the operational logic can proceed to block 74 where a determination is made if a user manually expands the workspace 54. For instance, menu options can be provided that will allow the user to select the size of the workspace 54. In one embodiment, the size of the workspace 54 can be determined by selection of the number of screens 56 from which workspace 54 is comprised. Accordingly, menu options can be provided for a set of predetermined workspace 54 arrangements, such as a single screen 56, a matrix of various sizes of screens 56 (e.g., a 2×2 matrix, a 3×3 matrix, a 2×3 matrix, a 4×4 matrix, etc.). Alternatively, menu options can be provided for the user to specify a desired number and arrangement of screens 56. It is noted that the screens 56 need not be arranged in a uniform matrix, but could be disposed in a pattern desired by the user (e.g., in an annular arrangement, to represent a plus sign, etc.). The expansion of the workspace can be carried out in processing block 76, after which the operational logic can return to processing block 66 to continue to monitor for user action that invokes processing by the workspace generation component 16a.

If a negative determination is made in processing block 74, the operational logic can proceed to processing block 78 where a determination is made as to whether the user has initiated action to contract the workspace 54. If the user has initiated action to contract the workspace 54, the operational logic can proceed to processing block 80 where the application workspace 54 is reduced in size. In one embodiment, reduction in size of the application workspace 54 can be made by reducing the number of screens 56 associated the application workspace 54. For this purpose, various menu options for reducing the application workspace 54 can be presented to the user. These menu options can take the same form as the options for expanding the workspace. For instance, if the application workspace 54 is currently sized as a 3×3 matrix of screens 56 (nine screens total) and the user selects a menu option to reduce the application workspace 54 to a 2×2 matrix of screens 56, five screens 56 will be removed from the application workspace 54. If any sub-application windows 58 are open in the screens 56 to be removed from the application workspace 54, those sub-application windows 58 can be either moved to screens 56 that will remain after resizing of the application workspace 54 or closed following an optional user authorization for the sub-application window(s) 58 to be closed. Following contraction of the workspace 54 in processing block 80 or if a negative determination is made in processing block 78, the operational logic can return to processing block 66 to continue to monitor for user action that invokes processing by the workspace generation component 16a.

Figure 6B:
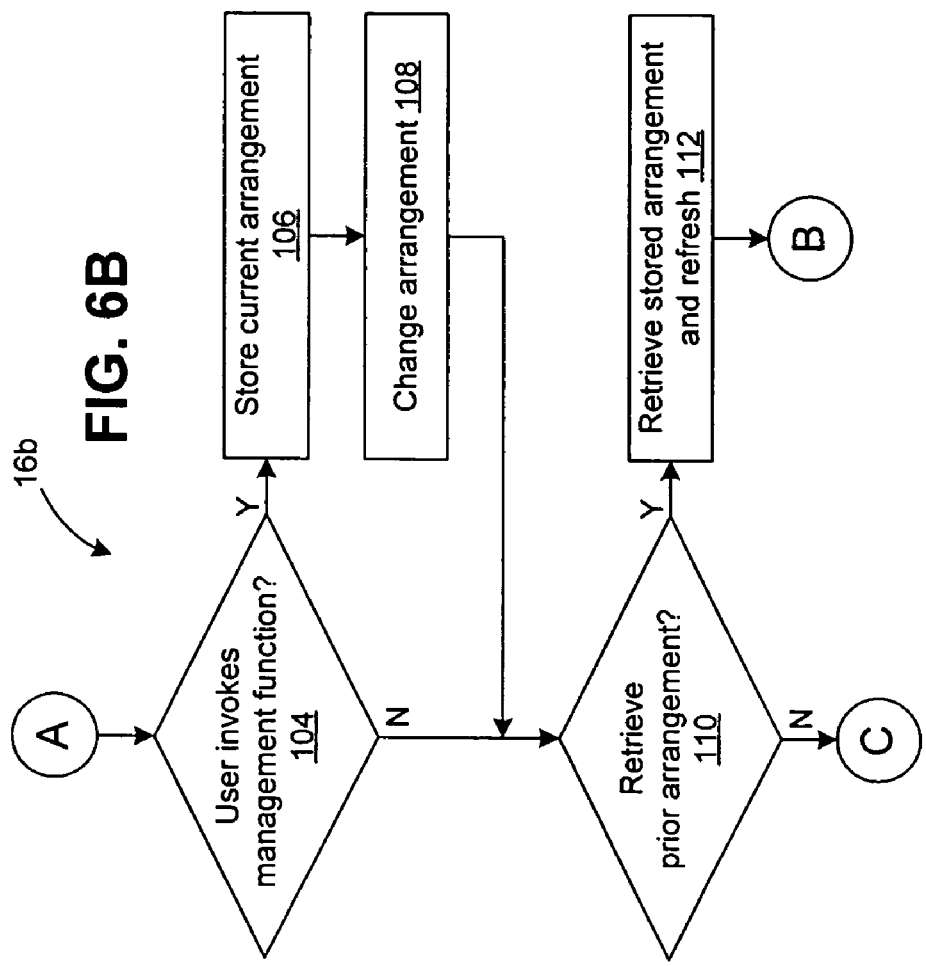
FIG. 6 is a flow diagram of operational logic for a navigation component of the workspace generation and navigation tool.

With additional reference to FIG. 6, an exemplary architecture, or operational logic, for the navigation component 16b of the workspace generation and navigation tool 14 is illustrated. The illustrated architecture shows operational processing blocks, each of which may represent a number of subprocesses, routines or applettes. The illustrated architecture is intended to show the functionality and operation of an implementation of the navigation component 16b. If embodied in software, each functional block may represent a module, segment or portion of code that contains one or more executable instructions to implement the specified logic functions.

Although the architecture is shown in a specific order of execution, it is understood that the order of execution may differ from that depicted. For example, the order of execution of two or more blocks may be altered relative to the order shown. Also, two or more blocks shown in succession may be executed concurrently or with partial concurrence. In addition, various blocks may be omitted. It is understood that all such variations are within the scope of the present invention.

The operational logic for the navigation component 16b can start in processing block 82 where a determination is made if the user activates a navigation box. With additional reference to FIG. 7 an example navigational box 84 is illustrated. For example, the user can activate the navigation box 84 by a specified user action such as making a menu selection or an appropriate action with the mouse 32, such as "right-clicking" on a displayed portion of the application workspace 54 that is not occupied by a sub-application window 58 or on an icon 50 displayed on a toolbar of the main application window 44. If a positive determination is made in processing block 82, the operational logic for the navigation component 16b can proceed to processing block 86. In processing block 86, the navigation component 16b can display the navigation box 84 on the display 28.

Figure 7:
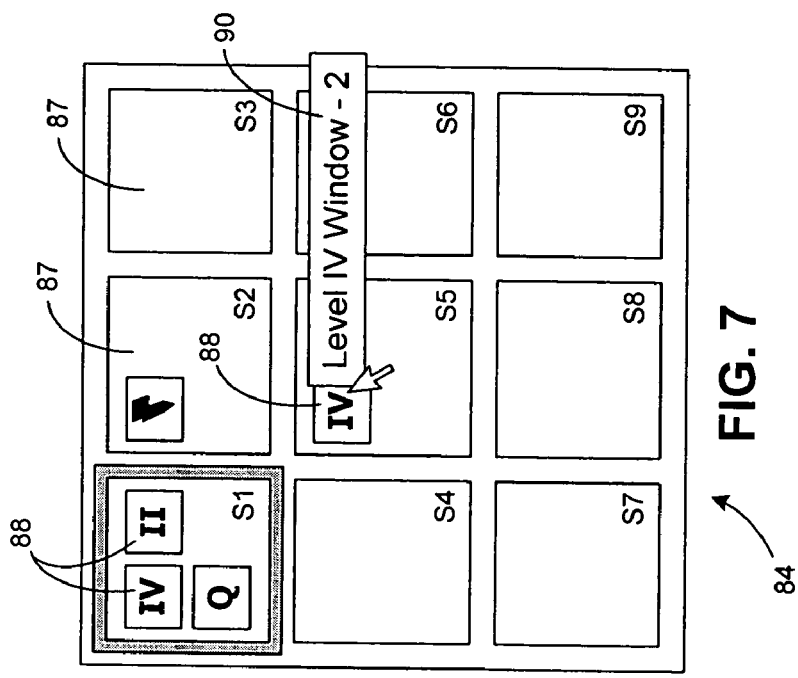
FIG. 7 is a schematic diagram of a navigation box according to the present invention.

As illustrated by example in FIG. 7, the navigation box 84 can display a representation of the application workspace 54. In the illustrated example, the represented application workspace 54 is comprised of a 3×3 matrix of screens 56. In the navigation box 84, each screen 56 is represented in a miniaturized form. In one embodiment, each screen representation 87 can be numbered or otherwise labeled for the convenience of the user. In the illustrated example, such labeling is carried out by the indicators S1-S9. In the embodiment where each screen 56 is associated with a unique identifying feature (e.g., colored and/or patterned background), each screen representation 87 can also be associated with corresponding identifying features. For example, a screen 56 having a blue background would have a corresponding screen representation 87 with a background of the same hue of blue.

For each screen 56 having a logically associated sub-application window(s) 58, the associated screen representation 87 can have an iconic and/or text representation 88 of the sub-application window(s) 58. Using the example in which the computer application 12 is a securities market and market maker tracking computer application, the illustrated navigation box 84 shows representations 88 of securities market and market maker activity application windows 58 that are displayed in the corresponding application workspace 54. For example, in the screen representation S1 (corresponding to an upper left hand corner screen 56 of the application workspace), shown are three icons used to respectively represent a level IV window, a level II window, and a quote window. In one embodiment, additional description of any application window representation 88 can be displayed by "rolling" the user's mouse pointer over the representation 88. In one embodiment, sub-application windows 58 can be moved from one screen 56 to another screen 56 by moving (e.g., "clicking and dragging") the representation 88 from one screen representation 87 to a second screen representation 87 within the navigation box 84.

With continued reference to FIG. 6, after the navigation box 84 is displayed in processing block 86, the operational logic can proceed to processing block 92 where a determination is made if the user uses the navigation box 84 to select a screen 56 other than the presently displayed screen 56 for display within the frame 46. In one embodiment, the navigation box 84 can highlight the screen representation 87 of the currently displayed screen 56. In the example illustration, representation S1 is highlighted to indicate that the currently displayed screen 56 corresponds to the upper left hand corner screen 56 of the corresponding application workspace 54. Selection of a different screen 56 for display as part of the application workspace window 44 can be made by user action. Such user actions can include, for example, a menu selection or by an action taken with the mouse 32, such as "left clicking" on one of the screen representations 87. If a positive determination is made in processing block 92, the operational logic can proceed to processing block 94 where the navigation box 84 can be removed from display on the display 28 and the displayed portion of the application window 54 can be updated to show the selected screen 56 in the area bound by the frame 46. Thereafter, or if a negative determination is made in processing block 92, the operational logic can proceed to processing block 96 where the navigation box 84 can be closed automatically or by user action. Following processing block 96, the operational logic can return to processing block 82 to continue to monitor for user action that initiates processing by the navigation component 16b.

If a negative determination is made in processing block 82, the operational logic can proceed to processing block 98. In processing block 98, a determination can be made as to whether the user has selected a drop down menu for navigating through or managing the application workspace 54. If a negative determination is made in processing block 98, the operational logic can return to block 82 where the operational logic continues to monitor for processing to be carried out by the navigation component 16b.

If a positive determination is made in processing block 98, the operational logic can proceed to processing block 100 where the drop down menu is displayed on the display 28. With additional reference to FIG. 8, an example drop down menu 102 is shown. Within the drop down menu 102, various sub-application window 58 management functions can be presented. For example, the management functions can include an arrange icons function, a cascade function, a tile horizontally function, and a tile vertically function. These functions can be used to arrange displayed sub-application windows 58 or iconic representations thereof on the application workspace 54.

If in block 104, the user invokes one of the management functions from the drop down menu 102, the operational logic can proceed to block 106. In block 106, the current arrangement of sub-application windows 58 on the application workspace 54 can be stored by the workspace generation and navigation tool 14. For example, the storing of block 106 can be a buffering function where the arrangement is stored in a temporary file or memory allocation. The storing of the arrangement can be transparent to the user. Thereafter, the operational logic can proceed to block 108 where the sub-application windows 58 are arranged in accordance with the user selected management function.

Following block 108, or if a negative determination is made in block 104, the operational logic can proceed to block 110 where a determination is made as to whether the user has selected a retrieve workspace arrangement from, for example, the drop down menu 102. If the user has selected to retrieve a previous arrangement of sub-application windows 58, the operational logic can proceed to block 112 where the arrangement stored in block 106 can be retrieved and the display 28 can be refreshed to show the application workspace 54 with sub-application windows 58 as arranged in the stored arrangement. In one embodiment multiple prior arrangements can be stored and retrieved. The act of retrieving in block 112 can be transparent to the user such that, in essence, the retrieve workspace arrangement functions as a "go back" or "undo" command to recover from a no longer desired change in sub-application window 58 arrangement. Following block 112, the operational logic can return to block 82 where the operational logic continues to monitor for processing to be carried out by the navigator component 16b.

Figure 8:
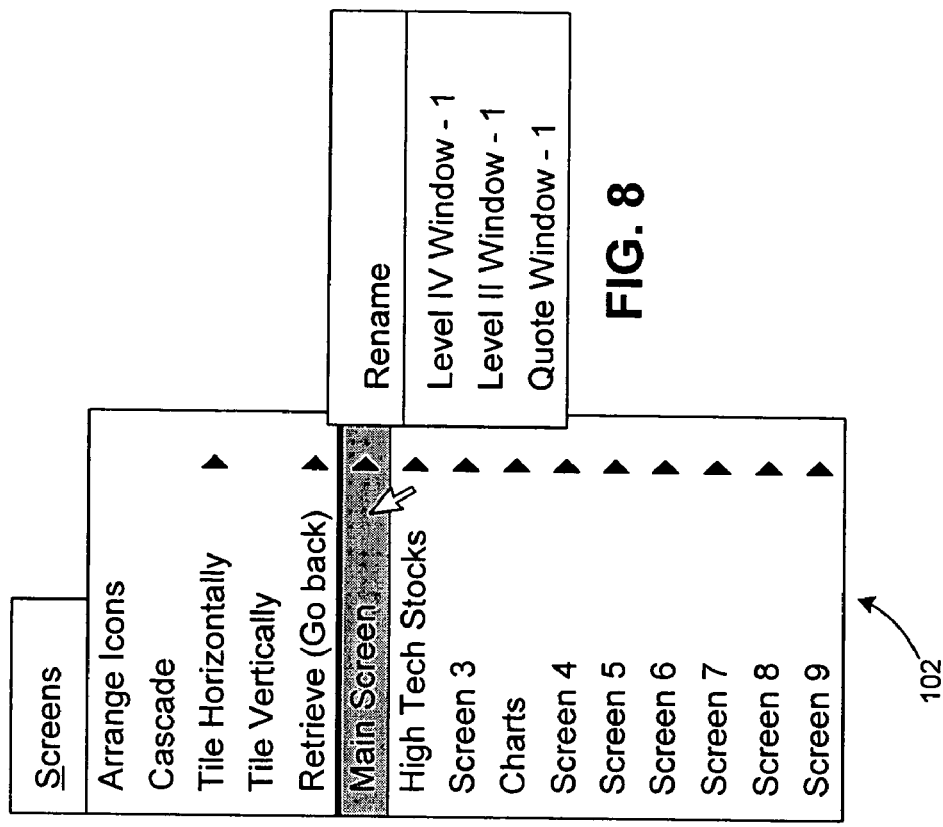
FIG. 8 is a schematic diagram of a drop down menu according to the present invention.

With continued reference to FIG. 8, the drop down menu 102 can also contain a list of each screen 56 that forms a part of the currently displayed application workspace 54. In the illustrated example of the drop down menu 102, nine screens are listed. The screens can be listed by a generic name, such as in the examples for screen 3 and screens 4-9. Alternatively, the screens can be identified by a name given by the user, such as in the examples of "main screen," "high tech stocks," and "charts." By user action, the navigation component 16b can display additional information about any of the screens identified in the drop down menu 102. For example, by "rolling" a mouse pointer over and/or clicking on one of the screen names, an additional menu can be displayed. The additional menu can contain an option to rename the associated screen 56. In addition, the additional menu can identify any sub-application windows 58 logically associated with the corresponding screen 56.

With continued reference to FIG. 6, if a negative determination is made in processing block 110, the operational logic for the navigation component 16b can proceed to processing block 92. Similar to the techniques for selecting a different screen using the navigation box 84, a user can select a different screen 56 for display as part of the application workspace window 44 by using the drop down menu 102. Accordingly, in processing block 92, a determination will be made if the user has selected a different screen 56 for viewing than the presently displayed screen 56. If a positive determination is made in processing block 92, the operational logic can proceed to block 94 where the screen 56 selected from the drop down menu 52 will be displayed within the frame 46. For example, the user can move the mouse pointer over the displayed name for the desired screen 56 and click a mouse button to select that screen 56.

As one skilled in the art will appreciate, other GUI techniques exist for selecting items that are displayed on a display 28 and/or for interacting with operational logic that is executed by the computer system 10. For example, these other techniques include actions taken using the keyboard 30, such as making various keystrokes, including the use of function keys and key combinations. Alternative methods for interfacing with the GUI include, for example, inputting audio information using the microphone 34, using a touch screen or other type of keypad, and the like.

Following block 94 or if a negative determination is made in block 92, the operational logic can proceed to block 96 where the drop down menu 102 can be closed. Following block 96, the operational logic can return to block 82 where the computer system 10 can monitor for user actions that invokes processing to be carried out by the navigation component 16b.

Figure 9:
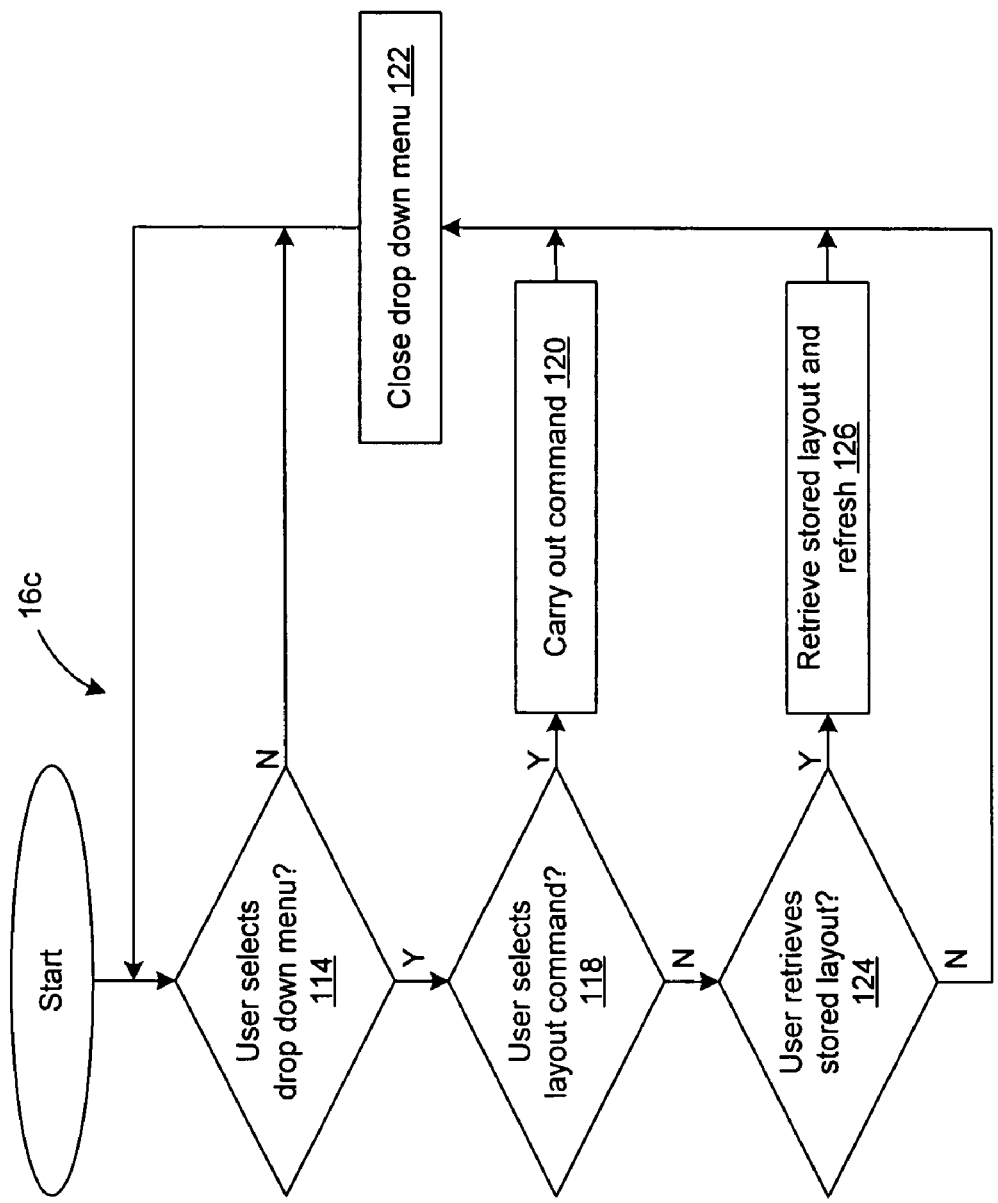
FIG. 9 is a flow diagram of operational logic for a layout management component of the workspace generation and navigation tool.

With additional reference to FIG. 9, an exemplary architecture, or operational logic, for a layout management component 16c of the workspace generation and navigation tool 14 is illustrated. The illustrated architecture shows operational processing blocks, each of which may represent a number of sub processes, routines or applettes. The illustrated architecture is intended to show the functionality and operation of an implementation of the layout management component 16c. If embodied in software, each functional block may represent a modular, segment or portion of code that contains one or more executable instructions to implement the specified logic functions.

Although the architecture is shown in a specific order of execution, it is understood that the order of execution may differ from that depicted. For example, the order of execution of two or more blocks may be altered relative to the order shown. Also, two or more blocks shown in succession may be executed concurrently or with partial concurrence. In addition, various blocks may be omitted. It is understood that all such variations are within the scope of the present invention.

The operational logic for the layout management component 16c can start in processing block 114 where a determination can be made if a user selects a layout management drop down menu. With continued reference to FIG. 10, an example layout management drop down menu 116 is illustrated. The drop down menu 116 can include command functions, such as new layout, save, save as, rename and delete. The layout management drop down menu 116 can also display a list of previously stored layouts.

Figure 10:
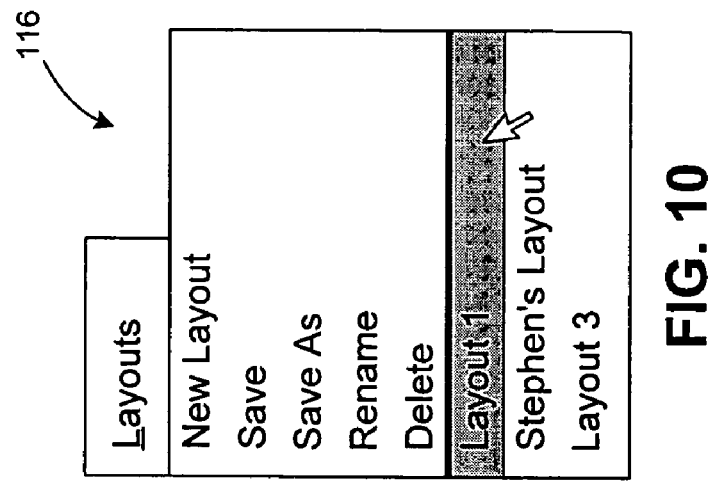
FIG. 10 is a schematic diagram of a layout drop down menu according to the present invention.

With continued reference to FIGS. 9 and 10, if a positive determination is made in block 114 the operational logic can proceed to block 118 where a determination is made as to whether the user has selected a command from the drop down menu 116 for managing layouts of the main computer application 12. As used herein, the term layout refers to a complete arrangement of an application workspace 54 including the number and arrangement of screens 56 from which the application workspace 54 is comprised and the sub-application windows 58 that are active within the application workspace 54 as well as the relative location of each sub-application window 58 in the application workspace 54.

If a positive determination is made in block 118, the operational logic can proceed to block 120 where functionality associated with the command is carried out. For example, if the user selects the new layout command, the workspace generation and navigation tool 14 can display a new application workspace 54 in conjunction with the main application window 44. The new application workspace 54 can be in a default format for the application workspace 54, such as an application workspace 54 having one screen 56 and no sub-application windows 58 associated therewith. As should be appreciated, alternative default application workspace 54 arrangements can be displayed upon the selection of the new layout command. In one embodiment, if a non-default application workspace 54 is displayed at the time that the user selects the new layout command, the user can be given an opportunity to save the current layout before the layout is superceded by the default application workspace 54.

As another example, the user can select the save or save as commands from the layout drop down menu 116 to respectively save the currently displayed layout under an existing file name or save the layout under a new file name. If the save command is selected and the currently displayed layout does not have an associated file name, the user may be prompted to supply a name for the layout, or the layout can be saved with a default name. As another example, the rename command can be used to rename a layout stored with an associated file name. As yet another example, the delete command can be used to remove a stored layout from memory. Following processing block 120, the operational logic can proceed to block 122. In block 122, the operational logic can close the drop down menu 116. Thereafter, the operational logic can return to processing block 114 to continue to monitor for user action that initiates processing by the layout management component 16c.

If a negative determination is made in processing block 118, the operational logic can proceed to processing block 124. In processing block 124, a determination can be made as to whether the user has selected to retrieve a previously stored layout for display as the application workspace 54. For example, a previously stored layout can be retrieved by selecting the desired layout from a list of previously stored layouts. The list of previously stored layouts can be displayed as part of the layout management drop down menu 116. In the illustrated example, three previously stored layouts are displayed in such a list and include the examples of "Layout 1," "Stephen's Layout" and "Layout 3." If a positive determination is made in processing block 124, the operational logic can proceed to processing block 126 where the selected layout is retrieved and the display 28 can be refreshed to show the application workspace 54 in accordance with the selected layout. If an unsaved layout is displayed at the time that the user selects a previously stored layout for retrieval, the operational logic can provide the user with an opportunity to save the currently displayed layout before superceding the currently displayed layout with the selected layout. Following processing block 126 or if a negative determination is made in processing block 124 the operational logic can proceed to processing block 122 where the drop down menu can be closed. Thereafter, the operational logic can return to processing block 114 to continue to monitor for user action that initiates processing by the layout management component 16c.

As should be appreciated, alternative techniques can be used to change the area of the application window 54 that is displayed in the application workspace window 44. For instance, the horizontal and/or vertical scrollbars 52 can be used to change the displayed area of the application window 54. As is known in the art, scrollbars can be used by depressing arrows associated with the scrollbar, moving a slider and/or clicking on the toolbar. All of these techniques can be used to scroll through the application workspace 54. Since the application workspace 54 can be continuous, using the scrollbars 52 can enable the user to display portions of two or more screens 56 at the same time. Another example technique for navigating around the application workspace 54 can include the use of a compass. For example, the application workspace window 44 can display a representation of a compass that includes pointers to move the application workspace 54 in one or more directions, such as up, down, left, right, and combinations of these directions (e.g., in a diagonal direction). By clicking on one of the compass directions, the application workspace 54 can be moved relative to the frame 46 in the indicated direction. The movement can be a continuous scrolling type movement or a quantum movement such as jumping from a displayed screen 56 to an adjacent screen 56.

Another example technique for navigating around the application workspace 54 can include the use of a zoom in/zoom out function. For example, a zoom in command button 128 (FIG. 2) and a zoom out command button 130 (FIG. 2) can be provided on a tool bar of the main application workspace window 44. Selecting the zoom out button 130, can cause the application workspace 54 to become compressed, thereby displaying a larger portion of the application workspace 54. As the application workspace 54 is compressed, the sub-application windows 58 can be compressed, or scaled, at the same proportional rate as the application workspace 54. As an example, if one screen 56 is displayed in the viewable area 55 and the user selects the zoom out button 130, the displayed screen 56 can be shrunk and shown in the viewable area 55 with one or more neighboring screens or portions of neighboring screens 56. Successive selection of the zoom out button can cause the application workspace 54 to continue to be contracted such that greater portions of the application workspace 54 are displayed in the viewable area 55.

As the sub-application windows 58 become smaller and smaller on the display 28, the sub-application windows 58 may become too small for a user to work with, but nevertheless can be large enough to be recognized. After zooming out and identifying a desired portion of the application workspace 54, the user can invoke an action to zoom back in on the desired portion of the application workspace 54. For example, the user can mark a location on the application workspace 54 and then zoom in using the zoom in button 128 until the scale of the application workspace 54 returns to having the dimensions of one screen 56 being generally coextensive with the viewable area 55. In another embodiment, the user can shift the application workspace 54 to be centered within the viewable area 55 around a desired location of the application workspace 54 and then the user can zoom in on the centered point of the application workspace 54. In another embodiment, selection of the zoom in and zoom out buttons can transform the mouse pointer respectively into enlarging and contracting magnifying glasses. When placed over the application workspace 54, clicking the enlarging magnifying glass enlarges the size of the application workspace 54 and clicking the contracting magnifying glass decreases the size of the application workspace 54.

It is noted that the zoom in button 128 can be used to scale the application workspace 54 such that one screen 56 can be larger than the viewable area 55 and such that content of the sub-application windows 58 appears on the display 28 as being enlarged. In this manner, a user can more closely examine and interact with content of the application workspace 54. In addition to zoom in and zoom out command buttons, corresponding drop down menu commands for zooming in and zooming out can be provided for user selection.

In one embodiment, the user can be given control over where a sub-application window 58 is displayed relative to the application workspace 54. For example, the user can transform the mouse pointer into a placement pointer by clicking on a placement pointer command button 132 from a tool bar of the main application window 44. Thereafter, the user can invoke a sub-application 15 to generate a sub-application window 58. Thereafter, the user can move the placement pointer to a desired location on the application workspace 54 and place the selected sub-application window 58 on the application workspace 54 in a location corresponding to the placement pointer. As will be appreciated selection of the placement pointer, selection of the sub-application 15 to generate the sub-application window 58, placement of the placement pointer with respect to the application workspace 54 and display of the desired sub-application window 58 can be carried out by using any appropriate input device (e.g., the mouse, keyboard or microphone) and interaction with features of the main application window 44, such as command buttons 50 and/or drop down menus 48. In an alternative arrangement, the user can select a placement tool and mark the application workspace 54 with a bookmark using the placement tool. Thereafter, the desired sub-application window 58 can be opened in a location defined by the bookmark. In one embodiment, the placement pointer or bookmark can be used to define placement of an upper left hand corner of a sub-application window 58, a center of the sub-application window 58 or any other part of the sub-application window 58.

The logic described herein can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store or maintain logic and/or data for use by or in connection with the instruction execution system. The computer-readable medium can be any one of a number of physical media such as, for example, electronic, magnetic, optical, electromagnetic, infrared or semiconductor media. More specific examples of suitable computer-readable medium can include, but are not limited to, a portable magnetic computer diskette such as a floppy disk, a hard disk, a random access memory (RAM), a read-only memory (ROM), a flash memory and a compact disk (e.g., a CD or DVD faced disk).

Although particular embodiments of the invention have been described in detail, it is understood that the invention is not limited correspondingly in scope, but includes all changes, modifications and equivalents coming within the spirit and terms of the claims appended hereto.

What is claimed is:

1. A computer-readable medium storing a computer application workspace generation and navigation tool that comprises:
    computer code within a main computer application that generates a continuous logical main application workspace that is larger in size than a physically viewable operating system desktop work area displayed on a physical computer system display, the continuous logical main application workspace comprised of a plurality of logical screen areas, wherein:
        each logical screen has predetermined dimensions that are coextensive with the physically viewable work area on the physical computer system display such that each logical screen has dimensions that are the same as every other logical screen;
        the logical screens are arranged contiguously in predetermined locations in the logical main application workspace such that the logical main application workspace is a single and functionally continuous logical workspace that is larger in size than the physical computer system display used to display the physically viewable work area; and
        each logical screen is individually selectable for navigation within the logical main application workspace;
    computer code that, by user action, jumps from the physically viewable area in the logical main application workspace to a selected one of the logical screens, the selected one of the logical screens being any logical screen in the logical main application workspace; and
    computer code that logically associates a plurality of sub-application windows with respective logical screens within the logical main application workspace, the sub-application windows for displaying content of at least one open sub-application, and that automatically increases the number of logical screens in response to a user action to move one of the sub-application windows to a new location outside current dimensions of the continuous logical main application workspace.

2. The computer-readable medium according to claim 1, wherein the code that increases the number of logical screens automatically adds logical screens in a number that is in excess of that needed to accommodate the new location of the sub-application window.

3. The computer-readable medium according to claim 1, further comprising code that logically associates each sub-application window location with a logical screen of the continuous main application workspace in which a majority of the sub-application window is disposed.

4. The computer-readable medium according to claim 1, further comprising code that stores an arrangement of sub-application windows locations disposed within the logical main application workspace.

5. The computer-readable medium according to claim 4, further comprising code that retrieves the stored arrangement of sub-application windows.

6. The computer-readable medium according to claim 1, further comprising code that stores a layout of the continuous logical main application workspace including a number and arrangement of logical screens and relative locations of each sub-application window within each logical screen within the continuous logical main application workspace.

7. The computer-readable medium according to claim 6, further comprising code that retrieves the stored layout.

8. The computer-readable medium according to claim 6, wherein the code stores a plurality of separate layouts for the logical main application workspace, wherein each layout has a different arrangement of logical screens and relative locations of each sub-application window within each logical screen within the continuous logical main application workspace.

9. The computer-readable medium according to claim 8, further comprising code that retrieves a selected stored layout from among the plurality of stored layouts.

10. The computer-readable medium according to claim 1, further comprising code that scales the continuous logical application workspace and sub-application windows to zoom the application workspace in or out.

11. The computer-readable medium according to claim 1, further comprising code that, upon initiation of one of the sub-application windows, logically associates the sub-application window with a logical screen within the continuous logical main application workspace identified by user action.

12. The computer-readable medium according to claim 11, further comprising code to provide the user with a user moveable placement means, wherein the logical screen associated with a sub-application window within the continuous logical main application workspace identified by user action corresponds to a logical screen including a location of the placement means relative to the continuous logical main application workspace.

13. The computer-readable medium according to claim 12, wherein the placement means is a placement pointer having a position that defines the location within the continuous logical workspace identified by user action.

14. The computer-readable medium according to claim 12, wherein the placement means is a placement tool for marking the location within the continuous logical workspace identified by user action.

15. The computer-readable medium according to claim 1, wherein the logical screens are contiguously arranged in a matrix.

16. The computer-readable medium according to claim 15, further comprising code that increases the number of logical screens and a corresponding dimension of the continuous logical main application workspace matrix in accordance with the user action to move one of the sub-application windows to a new location outside the current dimensions of the continuous logical main application workspace.

17. The computer-readable medium according to claim 1, further comprising code that decreases the number of logical screens and a corresponding dimension of the continuous logical main application workspace in accordance with a user action.

18. A computer-readable medium storing a computer application workspace generation and navigation tool that comprises:
 computer code within a main computer application that generates a continuous logical main application workspace that is larger in size than a physically viewable operating system desktop work area displayed on a physical computer system display, the continuous logical main application workspace comprised of a plurality of logical screen areas, wherein:
  each logical screen has predetermined dimensions that are coextensive with the physically viewable work area on the physical computer system display such that each logical screen has dimensions that are the same as every other logical screen;
  the logical screens are arranged contiguously in predetermined locations in the logical main application workspace such that the logical main application workspace is a single and functionally continuous logical workspace that is larger in size than the physical computer system display used to display the physically viewable work area; and
  each logical screen is individually selectable for navigation within the logical main application workspace;
 computer code that generates a navigation box that includes a representation of the continuous logical main application workspace including an indication of each logical screen within the workspace; and
 computer code that jumps from the physically viewable work area in the logical main application workspace to a logical screen selected by a user action from the navigation box;
 wherein the navigation box is displayed simultaneously with the physically viewable work area in the logical main application workspace.

19. The computer-readable medium according to claim 18, wherein the logical screen representations are arranged to have a topography corresponding to a topography of the logical screens.

20. The computer-readable medium according to claim 18, further comprising code that, in response to user selection of one of the logical screen representations in the navigation box, displays the corresponding logical screen on the computer system display in the physically viewable work area defined by the main computer application, while maintaining the display of the navigation box in the physically viewable work area.

21. The computer-readable medium according to claim 18, further comprising code that logically associates a plurality of sub-application windows with respective locations within the continuous logical main application workspace, the sub-application windows for displaying content of at least one open sub-application, and code that displays an iconic representation of each sub-application window in association with the representation of the logically associated screen shown in the navigation box.

22. The computer-readable medium according to claim 21, further comprising code that logically associates each sub-application window with a logical screen in which a majority of the sub-application window is disposed.

23. The computer-readable medium according to claim 21, further comprising code that moves and associates a user selected sub-application window from a logically associated screen to another logical screen in response to user initiated movement of the corresponding iconic representation of the user selected sub-application window in the navigation box, wherein the user selected sub-application window is moved without changing the display of the currently displayed logical screen within the physically viewable work area.

24. The computer-readable medium according to claim 21, further comprising code that displays information relating to each one of the sub-application windows in response to user action in connection with the iconic representation of the each one of the sub-application windows in the navigation box.

25. The computer-readable medium according to claim 1, further comprising code that provides a drop down menu from which a user can select and jump to one of the plurality of logical screens for display on the computer system display in the physically viewable work area defined by the main computer application.

26. The computer-readable medium according to claim 1, wherein the code that generates the continuous logical main application workspace generates a plurality of logical application workspaces for the main computer application.

27. The computer-readable medium according to claim 1, wherein each logical screen is associated with a unique identifying feature.

28. The computer-readable medium according to claim 27, wherein the unique identifying feature is selected from a background color, a background pattern and a combination thereof.

29. The computer-readable medium according to claim 1, wherein the selected logical screen does not contain any sub-application windows.

30. The computer-readable medium according to claim 1, further comprising code that generates a plurality of main application workspaces, wherein each main application workspace is a logical main application workspace and has a different arrangement of logical screens; and
 code that retrieves a selected main application workspace from among the plurality of main application workspaces.

31. A method of generating a computer application workspace by executing a program stored on a computer-readable medium, comprising:
 generating within a main computer application a continuous logical main application workspace that is larger in size than a physically viewable operating system desktop work area displayed on a physical computer system display, the continuous logical main application workspace comprised of a plurality of logical screen areas, wherein:
  each logical screen has predetermined dimensions that are coextensive with the physically viewable work area on the physical computer system display such that each logical screen has dimensions that are the same as every other logical screen;
  the logical screens are arranged contiguously in predetermined locations in the logical main application workspace such that the logical main application workspace is a single and functionally continuous logical workspace that is larger in size than the physical computer system display used to display the physically viewable work area; and
  each logical screen is individually selectable for navigation within the logical main application workspace;

by user action, jumping from the physically viewable area in the logical main application workspace to a selected one of the logical screens, the selected one of the logical screens being any logical screen in the logical main application workspace; and logically associating a plurality of sub-application windows with respective logical screens within the logical main application workspace, the sub-application windows for displaying content of at least one open sub-application, and automatically increasing the number of logical screens in response to a user action to move one of the sub-application windows to a new location outside current dimensions of the continuous logical main application workspace.

32. The method according to claim 31, wherein logical screens are automatically added in a number that is in excess of that needed to accommodate the new location of the sub-application window.

33. The method according to claim 31, further comprising logically associating each sub-application window location with a logical screen of the continuous logical main application workspace in which a majority of the sub-application window is disposed.

34. The method according to claim 31, further comprising storing an arrangement of sub-application windows locations disposed within the logical main application workspace.

35. The method according to claim 34, further comprising retrieving the stored arrangement of sub-application windows.

36. The method according to claim 31, further comprising storing a layout of the continuous logical main application workspace including a number and arrangement of logical screens and relative locations of each sub-application window within each logical screen in the continuous logical main application workspace.

37. The method according to claim 36, further comprising retrieving the stored layout.

38. The method according to claim 36, further comprising storing a plurality of separate layouts for the logical main application workspace, wherein each layout has a different arrangement of logical screens and relative locations of each sub-application window within each logical screen within the continuous logical main application workspace.

39. The method according to claim 38, further comprising retrieving a selected stored layout from among the plurality of stored layouts.

40. The method according to claim 31, further comprising scaling the continuous logical application workspace and sub-application windows to zoom the application workspace in or out.

41. The method according to claim 31, further comprising, upon initiation of one of the sub-application windows, logically associating the sub-application window with a logical screen within the continuous logical main application workspace identified by user action.

42. The method according to claim 41, further comprising providing the user with a user moveable placement means, wherein the logical screen associated with a sub-application window within the continuous logical main application workspace identified by user action corresponds to a logical screen including a location of the placement means relative to the main application workspace.

43. The method according to claim 42, wherein the placement means is a placement pointer having a position that defines the location of the continuous logical workspace identified by user action.

44. The method according to claim 42, wherein the placement means is a placement tool for marking the location of the continuous logical workspace identified by user action.

45. The method according to claim 31, wherein the logical screens are contiguously arranged in a matrix.

46. The method according to claim 45, further comprising increasing the number of logical screens and a corresponding dimension of the continuous logical main application workspace matrix in accordance with the user action to move one of the sub-application windows to a new location outside the current dimension of the continuous logical main application workspace.

47. The method according to claim 31, further comprising decreasing the number of logical screens and a corresponding dimension of the continuous logical main application workspace in accordance with a user action.

48. A method of generating a computer application workspace by executing a program stored on a computer-readable medium, comprising:

generating within a main computer application a continuous logical main application workspace that is larger in size than a physically viewable operating system desktop work area displayed on a physical computer system display, the continuous logical main application workspace comprised of a plurality of logical screen areas, wherein:

each logical screen has predetermined dimensions that are coextensive with the physically viewable work area on the physical computer system display such that each logical screen has dimensions that are the same as every other logical screen;

the logical screens are arranged contiguously in predetermined locations in the logical main application workspace such that the logical main application workspace is a single and functionally continuous logical workspace that is larger in size than the physical computer system display used to display the physically viewable work area; and each logical screen is individually selectable for navigation within the logical main application workspace;

generating a navigation box that includes a representation of the continuous logical main application workspace including an indication of each logical screen within the workspace; and jumping from the physically viewable work area in the logical main application workspace to a logical screen selected by a user action from the navigation box;

wherein the navigation box is displayed simultaneously with the physically viewable work area in the logical main application workspace.

49. The method according to claim 48, wherein the logical screen representations are arranged to have a topography corresponding to a topography of the logical screens.

50. The method according to claim 48, further comprising, in response to user selection of one of the logical screen representations in the navigation box, displaying on the computer system display the corresponding logical screen in the physically viewable work area defined by the main computer application, while maintaining the display of the navigation box in the physically viewable work area.

51. The method according to claim 48, further comprising logically associating a plurality of sub-application windows with respective locations within the continuous logical main application workspace, the sub-application windows for displaying content of at least one sub-application that is associated with the main computer application, and displaying an iconic representation of each sub-application window in association with the representation of the logically associated screen shown in the navigation box.

52. The method according to claim 51, further comprising logically associating each sub-application window with a logical screen in which a majority of the sub-application window is disposed.

53. The method according to claim 51, further comprising moving a user selected sub-application window from a logically associated screen to another logical screen in response to user initiated movement of the corresponding iconic representation of the user selected sub-application window in the navigation box, wherein the user selected sub-application window is moved without changing the display of the currently displayed logical screen within the physically viewable work area.

54. The method according to claim 51, further comprising displaying information relating to each one of the sub-application windows in response to user action in connection with the iconic representation of the each one of the sub-application windows in the navigation box.

55. The method according to claim 31, further comprising providing a drop down menu from which a user can select and jump to one of the plurality of logical screens for display on the computer system display in the physically viewable work area defined by the main computer application.

56. The method according to claim 31, further comprising generating a plurality of continuous logical main application workspaces for the main computer application.

57. The method according to claim 31, further comprising associating a unique identifying feature with each logical screen.

58. The method according to claim 57, wherein the unique identifying feature is selected from a background color, a background pattern and a combination thereof.

59. The method according to claim 31, wherein the selected logical screen does not contain any sub-application windows.

60. The method according to claim 31, further comprising code that generating a plurality of main application workspaces, wherein each main application workspace is a logical main application workspace and has a different arrangement of logical screens; and
retrieving a selected main application workspace from among the plurality of main application workspaces.

61. A computer-readable storing a computer application workspace generation and navigation tool that comprises:
computer code within a main computer application that generates a continuous logical main application workspace that is larger in size than a physically viewable operating system desktop work area displayed on a physical computer system display, the continuous logical main application workspace comprised of a plurality of logical screen areas, wherein:
each logical screen has predetermined dimensions that are coextensive with the physically viewable work area on the physical computer system display such that each logical screen has dimensions that are the same as every other logical screen;
the logical screens are arranged contiguously in predetermined locations in the logical main application workspace such that the logical main application workspace is a single and functionally continuous logical workspace that is larger in size than the physical computer system display used to display the physically viewable work area; and
each logical screen is individually selectable for navigation within the logical main application workspace;
computer code that generates a navigation box that includes a representation of the continuous logical main application workspace including an indication of each logical screen within the workspace;
computer code that jumps from the physically viewable work area in the logical main application workspace to a logical screen selected by a user action from the navigation box;
computer code that logically associates a plurality of sub-application windows with respective locations within the continuous logical main application workspace, the sub-application windows for displaying content of at least one open sub-application;
computer code that displays an iconic representation of each sub-application window in association with the representation of the logically associated screen; and
computer code that moves and associates a user selected sub-application window from a logically associated screen to another logical screen in response to user initiated movement of the corresponding iconic representation of the user-selected sub-application window in the navigation box, wherein the user selected sub-application window is moved without changing the display of the currently displayed area of the logical main application workspace within the physically viewable work area.

62. A method of generating a computer application workspace by executing a program stored on a computer-readable medium, comprising:
generating within a main computer application a continuous logical main application workspace that is larger in size than a physically viewable operating system desktop work area displayed on a physical computer system display, the continuous logical main application workspace comprised of a plurality of logical screen areas, wherein:
each logical screen has predetermined dimensions that are coextensive with the physically viewable work area on the physical computer system display such that each logical screen has dimensions that are the same as every other logical screen;
the logical screens are arranged contiguously in predetermined locations in the logical main application workspace such that the logical main application workspace is a single and functionally continuous logical workspace that is larger in size than the physical computer system display used to display the physically viewable work area; and
each logical screen is individually selectable for navigation within the logical main application workspace;
generating a navigation box that includes a representation of the continuous logical main application workspace including an indication of each logical screen within the workspace; and
jumping from the physically viewable work area in the logical main application workspace to a logical screen selected by a user action from the navigation box;
logically associating a plurality of sub-application windows with respective locations within the continuous logical main application workspace, the sub-application windows for displaying content of at least one sub-application that is associated with the main computer application;
displaying an iconic representation of each sub-application window in association with the representation of the logically associated screen; and moving and associating a user selected sub-application window from a logically associated screen to another logical screen in response to user initiated movement of the corresponding iconic representation of the user selected sub-application window in the navigation box, wherein the user-selected sub-application window is moved without changing the display of the currently displayed area of the logical main application workspace within the physically viewable work area.

* * * * *